(12) United States Patent
Tanaami et al.

(10) Patent No.: US 12,214,686 B2
(45) Date of Patent: Feb. 4, 2025

(54) CHARGING SYSTEM AND INFORMATION PROCESSING DEVICE

(71) Applicant: SINTOKOGIO, LTD., Nagoya (JP)

(72) Inventors: Yoshikane Tanaami, Nagoya (JP); Koji Ito, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 501 days.

(21) Appl. No.: 17/487,361

(22) Filed: Sep. 28, 2021

(65) Prior Publication Data

US 2022/0097544 A1    Mar. 31, 2022

(30) Foreign Application Priority Data

Sep. 30, 2020  (JP) ................. 2020-164799

(51) Int. Cl.
  *B60L 53/35*  (2019.01)
  *B60L 53/16*  (2019.01)
  *H01R 13/66*  (2006.01)

(52) U.S. Cl.
  CPC ............... *B60L 53/35* (2019.02); *B60L 53/16* (2019.02); *H01R 13/6683* (2013.01)

(58) Field of Classification Search
  CPC ...... B60L 53/35; B60L 53/16; H01R 13/6683
  USPC ......................................................... 320/109
  See application file for complete search history.

(56) References Cited

U.S. PATENT DOCUMENTS

2011/0254504 A1*  10/2011  Haddad .................. B60L 53/37
                                                        320/109
2018/0086219 A1*   3/2018  Malek .................... B60L 53/16
2020/0139820 A1*   5/2020  Cole ..................... B60L 53/35
2021/0094431 A1*   4/2021  Yang ..................... B60L 50/60
2021/0129346 A1    5/2021  Nagasaka et al.
2021/0237596 A1*   8/2021  Butina ................... B60L 53/14
2021/0276433 A1*   9/2021  Mandel-Senft ....... B60L 53/305

(Continued)

FOREIGN PATENT DOCUMENTS

CN      107745648 A  *  3/2018
CN      110920450 A  *  3/2020   ............. B60L 53/16
CN      112202033 A  *  1/2021   ............. B25J 11/00

(Continued)

OTHER PUBLICATIONS

Japanese Office Action for Japanese Patent Application No. 2020-164799 issued on Mar. 19, 2024 and English machine translation thereof.

*Primary Examiner* — Suresh Memula
(74) *Attorney, Agent, or Firm* — Harness, Dickey & Pierce, P.L.C.

(57) ABSTRACT

The present invention reduces the possibility that a connector for charging cannot be appropriately inserted into a power feeding port of an electric automobile.

The information processing device identifies a position of a power feeding port provided in an electric automobile and controls an arm portion, on the basis of a result of identification, so as to move a connector to a position facing the power feeding port. The information processing device controls the arm portion so as to insert the connector into the power feeding port. At this time, the information processing device controls the arm portion, on the basis of a value detected by a force sensor, so that a force along a direction other than an insertion direction in which the connector is inserted and/or a torque have/has a magnitude not greater than a threshold.

9 Claims, 5 Drawing Sheets

(56) References Cited

U.S. PATENT DOCUMENTS

2021/0331597 A1    10/2021    Kamon et al.

FOREIGN PATENT DOCUMENTS

| | | | | |
|---|---|---|---|---|
| DE | 102016014463 A1 | * | 6/2018 | ............ B25J 13/085 |
| DE | 102020000228 A1 | * | 10/2020 | |
| DE | 102020000330 A1 | * | 10/2020 | |
| DE | 102020103728 A1 | * | 8/2021 | |
| DE | 102020210670 A1 | * | 2/2022 | .............. B60L 53/16 |
| EP | 1916748 A1 | * | 4/2008 | |
| EP | 2481627 A2 | | 8/2012 | |
| ES | 2873941 T3 | * | 11/2021 | .............. B60L 53/14 |
| FR | 2907974 A1 | * | 5/2008 | .............. H01R 43/26 |
| JP | 2011-036107 A | | 2/2011 | |
| JP | 3169439 U | | 7/2011 | |
| JP | 2018-117433 A | | 7/2018 | |
| JP | 2018-192547 A | | 12/2018 | |
| JP | 2019-084637 A | | 6/2019 | |
| JP | 2019-140782 A | | 8/2019 | |
| JP | 2019-140879 A | | 8/2019 | |
| WO | WO-2019112585 A1 | * | 6/2019 | ............ B25J 13/085 |
| WO | WO-2018148089 A1 | * | 8/2019 | ........... G02B 6/3825 |
| WO | WO-2020222640 A1 | * | 11/2020 | .......... B25J 17/0216 |
| WO | WO-2021004732 A1 | * | 1/2021 | ............ B25J 9/1687 |

* cited by examiner

CHARGING SYSTEM AND INFORMATION PROCESSING DEVICE

This Nonprovisional application claims priority under U.S.C. § 119 on Patent Application No. 2020-164799 filed in Japan on Sep. 30, 2020, the entire contents of which are hereby incorporated by reference.

TECHNICAL FIELD

The present invention relates to a system for charging and an information processing device.

BACKGROUND ART

A technology for charging an electric automobile has been provided. Patent Literature 1 discloses an automated station for electric automobiles. In the automated station for electric automobiles, an RFID system reads a charging condition for an automobile waiting to be charged, and the charging condition is sent to a control panel. The control panel controls an automatic charging mechanism to charge the automobile on the basis of the charging condition read out.

CITATION LIST

Patent Literature

Patent Literature 1

Japanese utility model registration No. 3169439

SUMMARY OF INVENTION

Technical Problem

In a case where the charging of electric automobiles is automated, it is not always possible to insert a connector appropriately into a power feeding port. This is because a position of a power feeding port of an electric automobile and an insertion direction in which the connector is inserted may differ each time of feeding, depending on a stop position at which the electric automobile is stopped, a height of the electric automobile, and the like. With the technology disclosed in Patent Literature 1, it is not always possible to insert the connector appropriately into a power feeding port.

It is an objective of an aspect of the present invention to reduce the possibility that a connector for charging cannot be appropriately inserted into a power feeding port of an electric automobile.

Solution to Problem

In order to solve the above problem, a charging system in accordance with an aspect of the present invention is a charging system including an arm portion, a force sensor, a connector for charging, and one or more processors. The connector for charging is fixed to the arm portion with the force sensor interposed between the connector and the arm portion, and is configured to be inserted into a power feeding port of an electric automobile. The one or more processors are configured to carry out a position identification step, a moving control step, and an insertion control step. The position identification step includes identifying a position of a power feeding port provided in the electric automobile. The moving control step includes controlling the arm portion, on the basis of a result of identification in the position identification step, so as to move the connector to a position facing the power feeding port. The insertion control step includes controlling the arm portion so as to insert the connector into the power feeding port. In the insertion control step, the one or more processors control, on the basis of a value detected by the force sensor, the arm portion so that a force along a direction other than an insertion direction in which the connector is inserted and/or a torque have/has a magnitude not greater than a threshold.

Advantageous Effects of Invention

According to an aspect of the present invention, it is possible to reduce the possibility that a connector for charging cannot be appropriately inserted into a power feeding port of an electric automobile.

DESCRIPTION OF EMBODIMENTS

Embodiment 1

[Overview of System]

Figure 1:
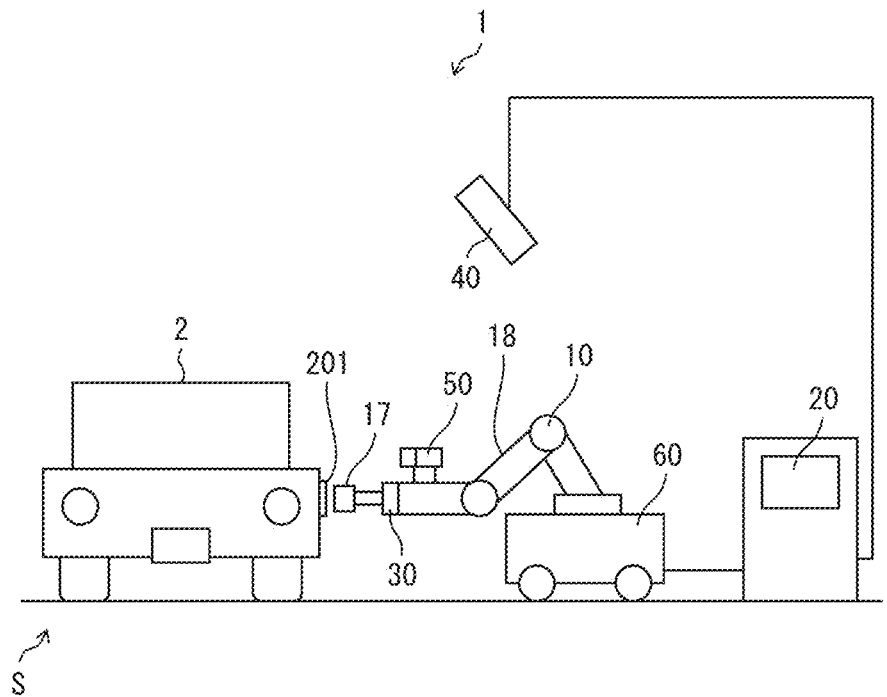
FIG. 1 is a view schematically illustrating a configuration of a charging system in accordance with Embodiment 1 of the present invention.

The following description will discuss Embodiment 1 of the present invention. FIG. 1 is a view schematically illustrating a configuration of a charging system 1 in accordance with Embodiment 1 of the present invention. The charging system 1 is a system that charges an electric automobile 2. The electric automobile 2 is an automobile that runs using electricity as an energy source and an electric motor as a power source. The electric automobile 2 is, for example, a secondary battery vehicle in which a secondary battery (a storage battery) is charged by being supplied with electricity externally, and the electricity is supplied from the secondary battery to the electric motor. The electric automobile 2 may be a so-called hybrid car in which an internal combustion mechanism and a secondary battery are used in combination. The electric automobile 2 has a power feeding port 201 into which a connector 17 for charging is inserted. A position of the power feeding port 201 differs depending on a vehicle type, a model number, and the like (hereinafter, simply referred to as a "vehicle type") of the electric automobile 2.

The charging system 1 includes a cooperative robot 10, an information processing device 20, and a force sensor 30. The cooperative robot 10 is a device for charging the electric automobile 2 stopped in a charging station S. The cooperative robot 10 includes an arm portion 18 such as a robot arm, and carries out an insertion operation of using the arm portion 18 to insert the connector 17 for charging into the power feeding port 201 of the electric automobile 2 and a removal operation of using the arm portion 18 to remove the connector 17 from the power feeding port 201. The information processing device 20 is a device for carrying out various arithmetic operations for controlling the cooperative robot 10 and is, for example, a personal computer.

The force sensor 30 is a sensor for detecting directions and magnitudes of a force and a torque and is, for example, a six-axis force-torque sensor. The force sensor 30 is not limited to the six-axis force-torque sensor, and may be other types of force sensor such as a four-axis force-torque sensor.

In FIG. 1, the charging system 1 includes one cooperative robot 10 and one information processing device 20. However, this configuration is not intended to limit Embodiment 1. The charging system 1 may include a plurality of cooperative robots 10, and may include a plurality of information processing devices 20.

Figure 2:
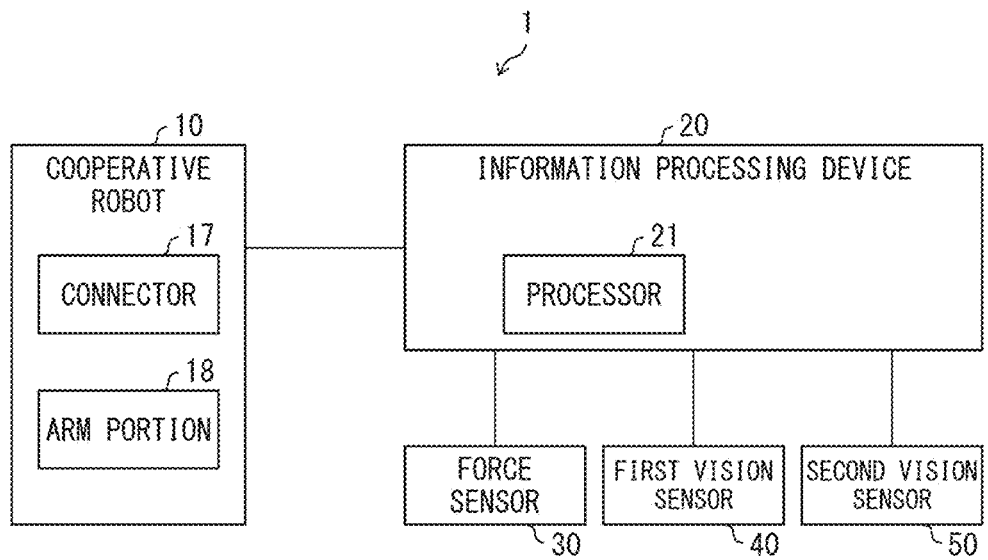
FIG. 2 is a block diagram schematically illustrating a configuration of the charging system in accordance with Embodiment 1 of the present invention.

FIG. 2 is a block diagram schematically illustrating a configuration of the charging system 1 in accordance with Embodiment 1 of the present invention. The cooperative robot 10 includes the connector 17 and the arm portion 18. The connector 17 is a connector for charging and is inserted into the power feeding port 201 of the electric automobile 2. The arm portion 18 moves the connector 17 and is, for example, a robot arm of the cooperative robot 10. The arm portion 18 includes one or more joints and operates by having each of the one or more joints driven. The connector 17 is fixed to the arm portion 18 via the force sensor 30.

The information processing device 20 includes a processor 21. The processor 21 carries out a charging control method M1 including a position identification step M11, a moving control step M12, and an insertion control step M13. The position identification step M11 is a step of identifying a position of the power feeding port 201 in the electric automobile 2. The processor 21, for example, determines a vehicle type of the electric automobile 2 on the basis of an image captured by an imaging device which captures an image of the electric automobile 2, and identifies the position of the power feeding port 201 on the basis of the vehicle type which has been determined.

The moving control step M12 is a step of controlling the arm portion 18, on the basis of a result of identification in the position identification step M11, so as to move the connector 17 to a position facing the power feeding port 201. The "position facing the power feeding port 201" is a position at which an insertion operation of inserting the connector 17 is started and at which the power feeding port 201 and the connector 17 face each other.

The insertion control step M13 is a step of controlling the arm portion 18 so as to insert the connector 17 into the power feeding port 201. In the insertion control step M13, the processor 21 controls the arm portion 18 on the basis of a value detected by the force sensor 30, such that a force along a direction other than an insertion direction in which the connector 17 is inserted and/or a torque have/has a magnitude not greater than a threshold.

The arm portion 18 changes an attitude and a position of the connector 17 by driving the one or more joints in accordance with control information supplied from the processor 21. The arm portion 18 carries out an insertion operation of inserting the connector 17 into the power feeding port 201 while changing the attitude and the position of the connector 17 in accordance with the control information supplied from the processor 21. Since the arm portion 18 changes the attitude and the position of the connector 17 during the insertion operation, the insertion direction in which the connector 17 is inserted into the power feeding port 201 changes during the insertion operation.

According to the above configuration, the charging system 1 controls the arm portion 18 so as to move the connector 17 to the power feeding port 201, and insert the connector 17 into the power feeding port 201 while carrying out a control such that a force along a direction other than the insertion direction in which the connector 17 is inserted and/or a torque have/has a magnitude not greater than a threshold. Since the processor 21 carries out a control during the insertion operation such that a force in a direction other than the insertion direction in which the connector 17 is inserted and/or a torque have/has a magnitude not greater than a threshold, the insertion direction in which the connector 17 is inserted changes during the insertion operation. Since the position of the power feeding port 201 and the insertion direction are thus corrected during the insertion operation, the insertion can be carried out appropriately.

[Configuration of System]

The following description will discuss a configuration of the charging system 1 with reference to FIG. 1. As illustrated in FIG. 1, the charging system 1 includes a first vision sensor 40, a second vision sensor 50, and an automated guided vehicle 60 in addition to the cooperative robot 10, the information processing device 20, and the force sensor 30.

The first vision sensor 40 captures an image of the electric automobile 2 stopped in the charging station S. The first vision sensor 40 is installed in the charging station S so as to be in a position and an attitude for capturing an image of the electric automobile 2 stopped in the charging station S. The first vision sensor 40 outputs, to the information processing device 20, data representing the image which has been captured. The first vision sensor 40 may make a determination, for example, by other types of sensor such as a photosensor.

The second vision sensor 50 captures an image of the power feeding port 201 of the electric automobile 2. The second vision sensor 50 is provided on the arm portion 18 of the cooperative robot 10. Further, the second vision sensor 50 is located so that an image-capturing direction of the second vision sensor 50 coincides with a direction in which the power feeding port 201, into which the connector 17 is inserted, is located. The second vision sensor 50 outputs, to the information processing device 20, data representing the image which has been captured. The second vision sensor 50 may make a determination, for example, by other types of sensor such as a photosensor.

The automated guided vehicle 60 is an example of a conveying mechanism for conveying the cooperative robot 10 including the arm portion 18. The automated guided vehicle 60 includes a moving mechanism such as a wheel or a caterpillar. The automated guided vehicle 60 is stopped at a predetermined position (hereinafter referred to as an "initial position") in the charging station S. When charging of the electric automobile 2 is carried out, the automated guided vehicle 60 conveys the cooperative robot 10 from the initial position to the vicinity of the power feeding port 201, on the basis of control information supplied from the information processing device 20. The automated guided vehicle 60 may be separate from the cooperative robot 10, or the automated guided vehicle 60 and the cooperative robot 10 may be integrally formed.

[Configuration of Cooperative Robot]

The cooperative robot 10 includes the connector 17 and the arm portion 18 as described above. The connector 17 is provided, for example, at an end of the arm portion 18. The connector 17 is connected to a charging cable. In a case where the connector 17 is inserted into the power feeding port 201, the electric automobile 2 is charged by supply of electricity from the charging cable. The cooperative robot 10 may include a notifying section (not illustrated) for notifying information to a driver of the electric automobile 2. The notifying section may be, for example, a speaker outputting a warning sound or a voice message, or a display displaying an image of a message or the like.

Figure 3:
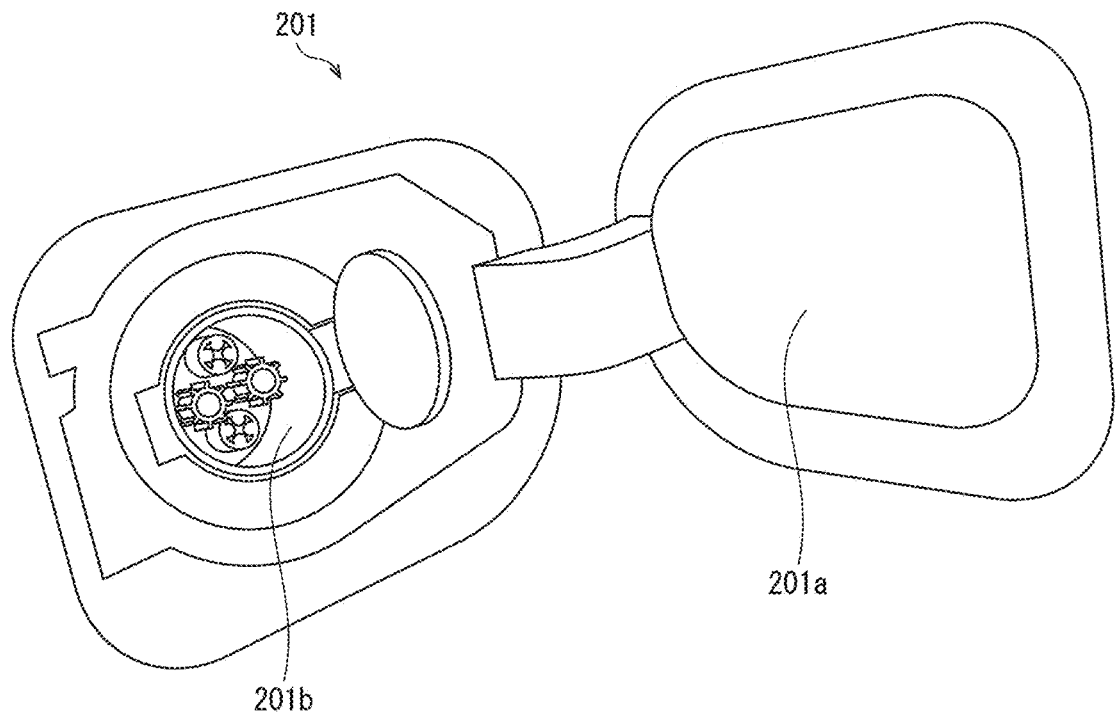
FIG. 3 is a diagram illustrating an appearance of a power feeding port.
Figure 4:
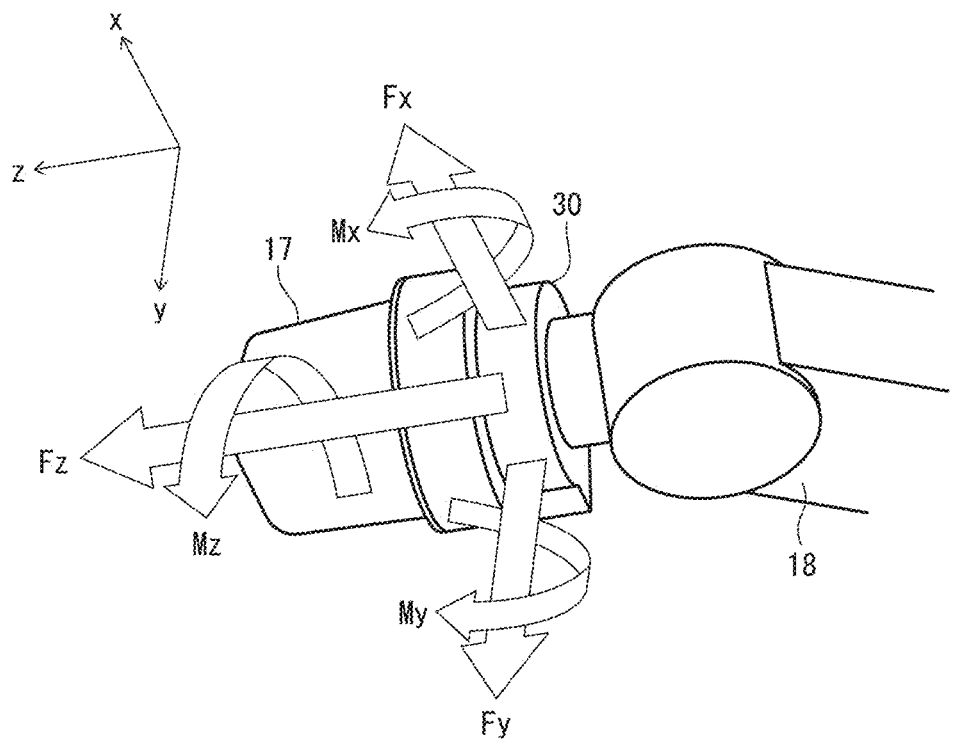
FIG. 4 is a diagram illustrating an appearance of a connector.

FIG. 3 is a diagram illustrating an appearance of the power feeding port 201 into which the connector 17 is inserted. FIG. 4 is a diagram illustrating an appearance of the connector 17. In FIG. 3, the power feeding port 201 includes a cover portion 201a and a cavity 201b. The cover portion 201a is provided so as to be openable and closable. In a closed state, the cover portion 201a is fixed in a state of covering the cavity 201b. When the cover portion 201a is opened, the cavity 201b is exposed to the outside. A driver of the electric automobile 2 operates a predetermined operator (an operation button or the like) of the electric automobile 2 to open and/or close the cover portion 201a.

The connector 17 has a protruding shape that fits into the cavity 201b. In a case where the connector 17 is inserted into the power feeding port 201, charging of the electric automobile 2 is carried out. In the example illustrated in FIG. 4, the connector 17 is fixed to the end of the arm portion 18 of the cooperative robot 10 with the force sensor 30 interposed between the connector 17 and the end. When the one or more joints of the arm portion 18 are driven, a position and an attitude of the connector 17 change in accordance with the motion of the arm portion 18. The shapes of the power feeding port 201 and the connector 17 are not limited to those illustrated in FIGS. 3 and 4, and may be various shapes.

In Embodiment 1, the force sensor 30 is a six-axis force-torque sensor. In the example illustrated in FIG. 4, the force sensor 30 detects force components Fx, Fy, and Fz along an x axis, a y axis, and a z axis and torque components Mx, My, and Mz along the x axis, the y axis, and the z axis in a three-dimensional space defined by the x axis, the y axis, and the z axis. In the example illustrated in FIG. 4, the force sensor 30 is fixed in such an attitude that the positive z direction coincides with the insertion direction in which the connector 17 is inserted. That is, in a case where the attitude or the position of the connector 17 changes due to an operation of the arm portion 18, the directions of the components detected by the force sensor 30 also change in accordance with the change in the attitude or the position of the connector 17. The information processing device 20 obtains the components detected by the force sensor 30.

Although the description of Embodiment 1 deals with a configuration in a case where the force sensor 30 and the cooperative robot 10 are separate entities, a configuration may be employed in which the force sensor 30 is contained in the cooperative robot 10. In that case, the cooperative robot 10 outputs components detected by the force sensor 30 to the information processing device 20.

[Configuration of Information Processing Device 20]

Figure 5:
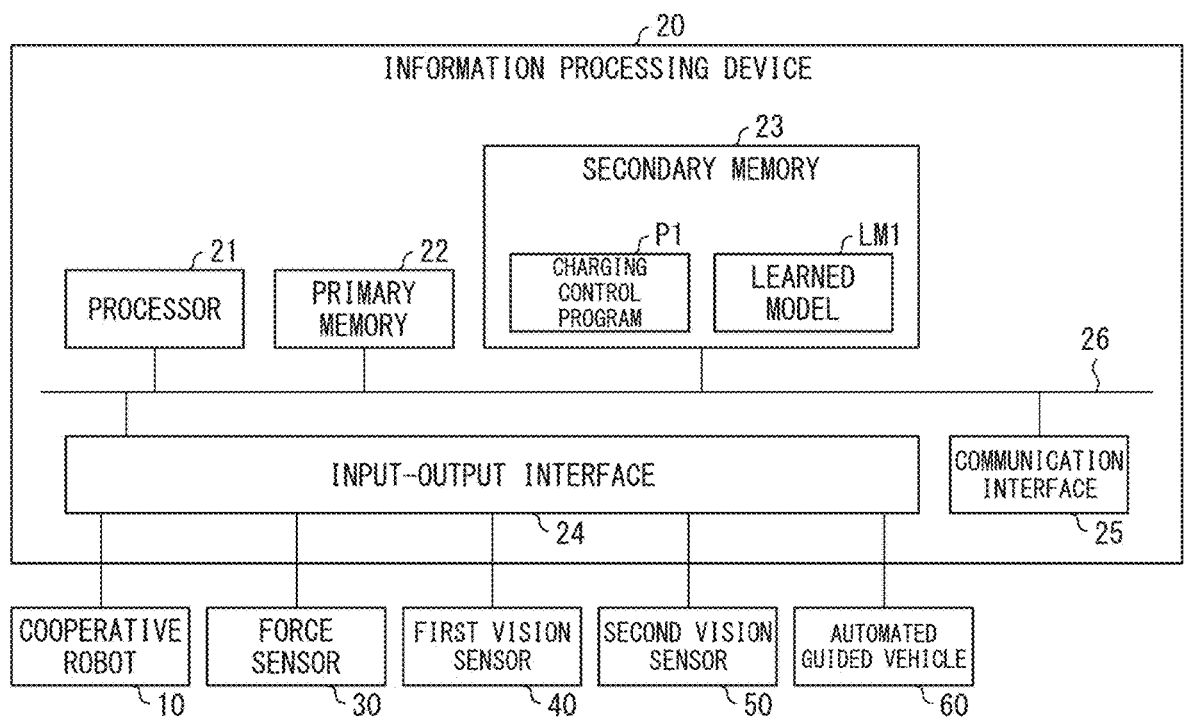
FIG. 5 is a block diagram illustrating a configuration of an information processing device.

FIG. 5 is a block diagram illustrating a configuration of the information processing device 20. The information processing device 20 is realized by a general purpose computer, and includes the processor 21, a primary memory 22, a secondary memory 23, an input-output interface 24, a communication interface 25, and a bus 26. The processor 21, the primary memory 22, the secondary memory 23, the input-output interface 24, and the communication interface 25 are connected to one another via the bus 26.

The secondary memory 23 has a charging control program P1 and a learned model LM1 stored therein. The processor 21 causes the charging control program P1 and the learned model LM1 stored in the secondary memory 23 to be loaded in the primary memory 22 and carries out steps included in the charging control method M1 in accordance with instructions contained in the charging control program P1 loaded in the primary memory 22. The learned model LM1 loaded in the primary memory 22 is used when the processor 21 carries out the position identification step M11 of the charging control method M1. Note that the phrase "the secondary memory 23 has the charging control program P1 stored therein" means that a source code or an executable file obtained by compiling the source code is stored in the secondary memory 23. The phrase "the secondary memory 23 has the learned model LM1 stored therein" means that parameters defining the learned model LM1 are stored in the secondary memory 23.

A device that can be used as the processor 21 is, for example, a central processing unit (CPU). A device that can be used as the primary memory 22 is, for example, a semiconductor random access memory (RAM). A device that can be used as the secondary memory 23 is, for example, a flash memory.

The input-output interface 24 is configured to have input device(s) and/or output device(s) connected thereto. The input-output interface 24 is, for example, a universal serial bus (USB). Data obtained from the cooperative robot 10, the force sensor 30, the first vision sensor 40, and the second vision sensor 50 in the charging control method M1 are inputted to the information processing device 20 via the input-output interface 24. Information provided to a user in the charging control method M1 is outputted from the information processing device 20 via the input-output interface 24.

The communication interface 25 is an interface for communicating with other computers. Examples of the communication interface 25 may include an interface for communicating with other computers without using a network, such as a Bluetooth (registered trademark) interface. Examples of the communication interface 25 may also include an interface for communicating with other computers over a local area network (LAN), such as a Wi-Fi (registered trademark) interface. The cooperative robot 10 and the information processing device 20 may be connected to each other by the input-output interface 24 or may be connected to each other by the communication interface 25.

Note that, although Embodiment 1 employs a configuration in which a single processor (processor 21) is used to carry out the charging control method M1, the present invention is not limited to such. That is, a configuration in which a plurality of processors are used to carry out the charging control method M1 may be employed. In this case, a plurality of processors which work together to carry out the charging control method M1 may be provided in a single computer and configured to be communicable with each other through a bus or may be provided in a respective plurality of computers and configured to be communicable with each other over a network. For example, the following configuration can be employed: a processor contained in a computer constituting a cloud server and a processor contained in a computer owned by a user of the cloud server work together to carry out the charging control method M1.

Although Embodiment 1 employs a configuration in which the learned model LM1 is stored in a memory (secondary memory 23) that is contained in the computer in which a processor (processor 21) that carries out the charging control method M1 is contained, the present invention is not limited to such. That is, the following configuration may be employed: the learned model LM1 is stored in a memory that is contained in a computer different from the computer in which the processor that carries out the charging control method M1 is contained. In this case, the computer in which the memory having the learned model LM1 stored therein is contained is configured to be communicable, over a network, with the computer in which the processor that carries out the charging control method M1 is contained. For example, the following configuration can be employed: the learned model LM1 is stored in a memory contained in a computer constituting a cloud server; and a processor contained in a computer owned by a user of the cloud server carries out the charging control method M1.

Although Embodiment 1 employs a configuration in which the learned model LM1 is stored in a single memory (secondary memory 23), the present invention is not limited to such. That is, the following configuration may be employed: the learned model LM1 is divided into a plurality of parts and stored in a respective plurality of memories. In this case, the plurality of memories in which the parts of the learned model LM1 are stored may be provided in a single computer (which may be or may not be the computer in which a processor that carries out the charging control method M1 is contained) or in a respective plurality of different computers (which may or may not include the computer in which a processor that carries out the charging control method M1 is contained). For example, the following configuration may be employed: the learned model LM1 is divided into a plurality of parts and stored in a respective plurality of memories contained in a respective plurality of computers constituting a cloud server.

The learned model LM1 is a learned model for determining the vehicle type of the electric automobile 2. The learned model LM1 is a model which has been trained to use, as an input, an image captured by the first vision sensor 40 and to output the vehicle type of the electric automobile 2. Examples of the learned model LM1 include algorithms such as neural network models (e.g., convolutional neural network and recurrent neural network), regression models (e.g., linear regression), and tree models (e.g., regression tree).

[Operation of Charging Electric Automobile 2]

Figure 6:
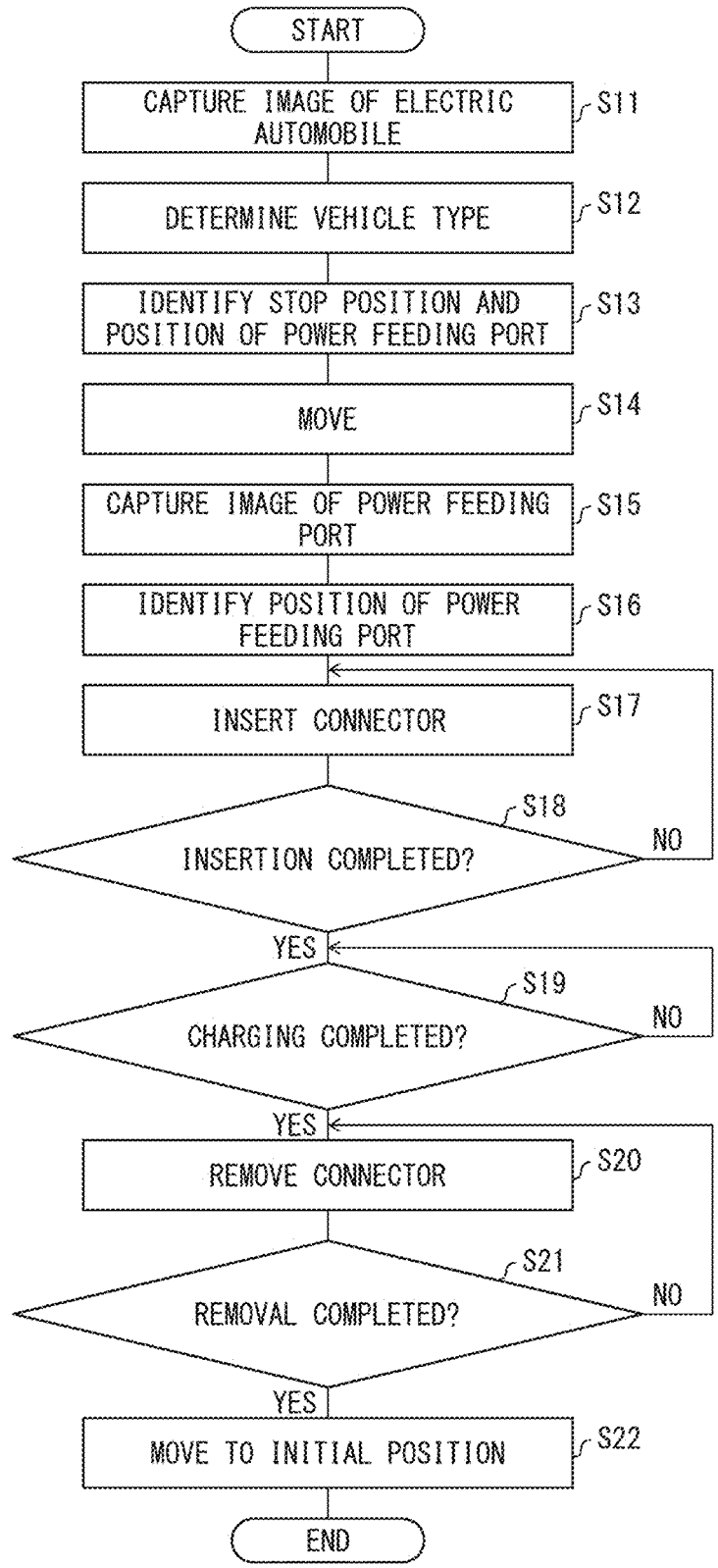
FIG. 6 is a flowchart illustrating an example of a charging operation carried out by the charging system.

FIG. 6 is a flowchart illustrating a flow of a charging operation carried out by the charging system 1. In a case where the electric automobile 2 is stopped in the charging station S, the first vision sensor 40, in Step S11, captures an image of the electric automobile 2 stopped in the charging station S and outputs data representing the image which has been captured to the information processing device 20.

In Step S12, the processor 21 determines the vehicle type of the electric automobile 2 on the basis of the image captured by the first vision sensor 40. The processor 21 determines the vehicle type using, for example, the learned model LM1.

The processor 21 may use, as an input image, the image captured by the first vision sensor 40 or a part of the image captured by the first vision sensor 40. The processor 21 determines the vehicle type of the electric automobile 2 on the basis of an output value obtained by inputting the input image to the learned model LM1 constructed by machine learning.

Note that the processor 21 may determine the vehicle type of the electric automobile 2 by, for example, rule-based determination without using the learned model LM1. In this case, for example, image data representing an image captured of the electric automobile 2 is stored in advance in the secondary memory 23 of the information processing device 20 for each vehicle type. The processor 21 analyzes an image captured by the first vision sensor 40 and determines the vehicle type of the electric automobile 2 by a technique such as pattern matching with use of the image data stored in advance.

In Step S13, the processor 21 identifies a stop position at which the electric automobile 2 is stopped and a position of the power feeding port 201 on the basis of the vehicle type determined in Step S12. In Embodiment 1, the processor 21 analyzes the image captured by the first vision sensor 40 and identifies the stop position at which the electric automobile 2 is stopped and an approximate position of the power feeding port 201. For example, image data representing an image captured of the electric automobile 2 is stored in advance in the secondary memory 23 of the information processing device 20 for each vehicle type, and the processor 21 uses the image data to carry out the process of identification. In this case, for example, the processor 21 may identify the stop position at which the electric automobile 2 is stopped and an orientation of the automobile body by a technique such as pattern matching with use of the image captured by the first vision sensor 40 and the image data stored in advance. Alternatively, for example, the processor 21 refers to a table in which a vehicle type of the electric automobile 2 and a position of the power feeding port 201 are stored in association with each other, and identifies a position of the power feeding port 201 which position corresponds to the vehicle type determined in Step S12.

Upon identifying the position of the power feeding port 201, the processor 21 outputs, to the automated guided vehicle 60, control information for moving the automated guided vehicle 60 to the vicinity of the power feeding port 201. That is, the processor 21 causes the automated guided vehicle 60 to convey the arm portion 18 to the vicinity of the power feeding port 201, and also causes the arm portion 18 to move the connector 17 to a position facing the power feeding port 201. Upon obtaining the control information from the information processing device 20, the automated guided vehicle 60, in Step S14, moves the cooperative robot 10 to the position indicated by the information processing device 20, on the basis of the control information which has been obtained.

When conveyance by the automated guided vehicle 60 is completed, the cooperative robot 10 moves the connector 17 to a position facing the power feeding port 201, and changes the attitude of the connector 17 to an attitude for starting the insertion operation. The attitude of the connector 17 when the arm portion 18 starts the insertion operation is preset, for example, for each vehicle type of the electric automobile 2. In this case, for example, a vehicle type of the electric automobile 2 and an attitude of the connector 17 are stored in advance in the secondary memory 23 in association with each other, and the processor 21 indicates, to the arm portion 18, an attitude corresponding to the vehicle type of the electric automobile 2 to be charged. As a result of the above moving operation, the second vision sensor 50 and the power feeding port 201 are in such a positional relationship that the power feeding port 201 is located in a direction coinciding with an image-capturing direction of the second vision sensor 50.

A driver of the electric automobile 2 carries out, at a point in time after the electric automobile 2 is stopped in the charging station S, an operation for opening the cover portion 201a of the power feeding port 201 by using the operator (the operation button or the like) provided in the electric automobile 2. The electric automobile 2 opens the cover portion 201a on the basis of operation information outputted from the operator. When the cover portion 201a is opened, the cavity 201b is exposed to the outside.

In Step S15, the second vision sensor 50 captures an image of the power feeding port 201 and outputs image data representing the image which has been captured. In Step S16, the processor 21 identifies a position of the power feeding port 201 on the basis of the image captured by the second vision sensor 50. Although the position of the power feeding port 201 has been identified in Step S13, an air pressure in the tires of the electric automobile 2, an inclination of the ground, and the like may misalign the power feeding port 201. As such, in Step S16, the processor 21 identifies a position of the power feeding port 201 with higher accuracy by analyzing the image captured by the second vision sensor 50.

Specifically, for example, image data representing an image captured of the power feeding port 201 of the electric automobile 2 is stored in advance in the secondary memory 23 of the information processing device 20 for each vehicle type. The processor 21 identifies the position of the power feeding port 201 of the electric automobile 2 by a technique such as pattern matching with use of the image captured by the second vision sensor 50 and the image data stored in advance. Further, the processor 21 stores, in the secondary memory 23, information (hereinafter, referred to as "start position information") indicating a position at which an insertion operation of inserting the connector 17 is started. This information is referred to when a removal operation of removing the connector 17 is carried out.

In Step S16, in a case where the cover portion 201a of the power feeding port 201 is in a closed state, the processor 21 may not be able to appropriately identify the position of the power feeding port 201. In a case where identification of the position is unsuccessful, the processor may notify the driver by controlling the cooperative robot 10 to output a warning sound or output a voice message stating, for example, "Please open the cover of the power feeding port".

In Step S17, the processor 21 controls the arm portion 18 so as to insert the connector 17 into the power feeding port 201. The arm portion 18 carries out, on the basis of control information supplied from the processor 21, an insertion operation of inserting the connector 17 into the power feeding port 201, the position of which has been identified in Step S16. At this time, the processor 21 controls, on the basis of a value detected by the force sensor 30, the arm portion 18 so that a force along a direction other than an insertion direction in which the connector 17 is inserted and/or a torque have/has a magnitude not greater than a threshold.

Specifically, in the example illustrated in FIG. 4, the processor 21 causes the insertion operation to be carried out by controlling the arm portion 18 so that the connector 17 moves in the insertion direction (that is, the positive z direction of the force sensor 30). Further, during the insertion operation, the processor 21 controls the arm portion 18 so that absolute values of values of components detected by the force sensor 30 other than the force component Fz, i.e., absolute values of detected values of the components Fx and Fy and the torque components Mx, My, and Mz, are each not greater than a predetermined threshold. The predetermined threshold, for example, may be zero or may be a value greater than zero. As the threshold, for example, a different value may be set for each component, or a threshold common to a plurality of components may be used.

Figure 7:
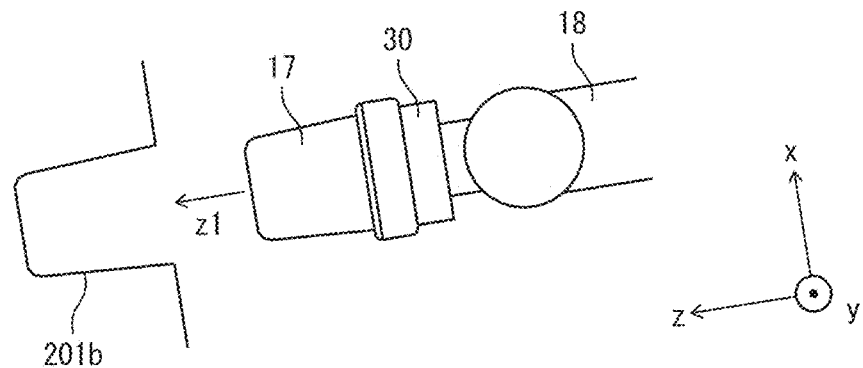
FIG. 7 is a schematic view for explaining an insertion operation of inserting the connector into the power feeding port.
Figure 8:
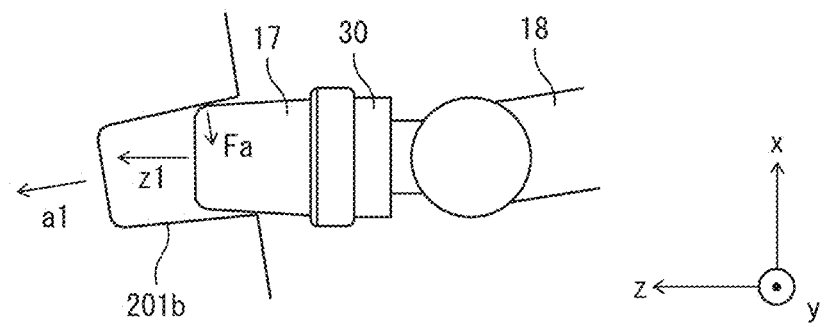
FIG. 8 is a schematic view for explaining an insertion operation of inserting the connector into the power feeding port.

FIGS. 7 and 8 are schematic views for explaining an example of the insertion operation of inserting the connector 17 into the power feeding port 201. In FIG. 7, the arm portion 18 inserts the connector 17 in an insertion direction z1, which coincides with the positive z direction of the force sensor 30, on the basis of control information supplied from the processor 21. During the insertion operation, in a case where a desired insertion direction a1 and the insertion direction z1 in which the connector 17 is inserted are misaligned from each other, a portion of the connector 17 collides against an inner wall of the cavity 201b of the power feeding port 201, and the connector 17 is pressed against the inner wall of the cavity 201b, as illustrated in FIG. 8. This causes an external force Fa to be applied from the cavity 201b to the connector 17 and the force sensor 30.

The force sensor 30 detects force components and torque components of the external force Fa. The processor 21 supplies control information for correcting the position and the attitude of the connector 17 to the arm portion 18 so that values detected by the force sensor 30 of components other than the force component Fz are each not greater than the threshold. In the example illustrated in FIG. 8, for example, the processor 21 supplies, to the arm portion 18 on the basis of the values detected by the force sensor 30, control information for correcting the position and the attitude of the connector 17 so as to reduce a difference between the insertion direction z1, which coincides with the positive z direction of the force sensor 30, and the desired insertion direction a1.

Thus, the arm portion 18 carries out the insertion operation of inserting the connector 17 into the power feeding port 201 while correcting the position and the attitude of the connector 17 on the basis of the control information supplied by the processor 21. The processor 21 repeatedly carries out the above-described correction process, for example, every predetermined unit time. By carrying out the insertion operation while repeatedly correcting the position and the attitude of the connector 17, it is possible to insert the connector 17 while correcting the insertion direction even in a case where, for example, the insertion direction (z direction of the force sensor 30) in which the connector 17 is inserted is misaligned with the desired insertion direction a 1. This reduces the possibility that the connector 17 cannot be appropriately inserted into the power feeding port 201 of the electric automobile 2.

In the example illustrated in FIG. 4, as described above, the processor 21 controls the arm portion 18 so that absolute values of values of components detected by the force sensor 30 other than the force component Fz, i.e., absolute values of detected values of the components Fx and Fy and the torque components Mx, My, and Mz, are each not greater than a predetermined threshold. The control method by the processor 21 is not limited to the above-described method, and the processor 21 may control the arm portion 18 so that detected values of the force components (Fx, Fy) or the torque components (Mx, My, Mz) are each not greater than a threshold.

The following description refers back to FIG. 6. In Step S18, the processor 21 determines whether or not the insertion of the connector 17 into the power feeding port 201 has been completed. When the insertion of the connector 17 into the power feeding port 201 is completed, the connector 17 and the force sensor 30 receive from the cavity 201b an external force along the z axis. On the basis of whether or not the force sensor 30 has detected an external force greater than a threshold in the insertion direction (along the z axis), the processor 21 determines whether or not the insertion of the connector 17 has been completed. In a case where a magnitude of the force along the z axis detected by the force sensor 30 is greater than a predetermined threshold, the processor 21 determines that the insertion has been completed. In a case where the magnitude of the force along the z axis detected by the force sensor 30 is less than the threshold, the processor 21 determines that the insertion has not been completed. In a case where the insertion has been completed (YES in Step S18), the processor 21 proceeds to the process of Step S19. In a case where the insertion has not been completed (NO in Step S18), the processor 21 returns to the process of Step S17 to continue the insertion operation.

In a case where the connector 17 is inserted into the power feeding port 201, charging of the electric automobile 2 is carried out. In Step S19, the processor 21 determines whether or not the charging of the electric automobile 2 has been completed. For example, in a case where a value of an electric current supplied to the electric automobile 2 by the connector 17 has decreased to a predetermined value, the processor 21 determines that the charge has been completed.

In a case where the charge has been completed (YES in Step S19), the processor 21 proceeds to the process of Step S20. In a case where the charging has not been completed (NO in Step S19), the processor 21 returns to the process of Step S19, and waits until the charging is completed.

In Step S20, the arm portion 18 carries out a removal operation of removing the connector 17 from the power feeding port 201, on the basis of control information supplied from the processor 21. The removal operation is the opposite of the insertion operation in Step S17. That is, the processor 21 supplies, to the arm portion 18, control information for moving the connector 17 in a direction (i.e., the negative z direction of the force sensor 30) opposite to the insertion direction.

Also in the removal operation, the processor 21 causes the removal operation of removing the connector 17 from the power feeding port 201 to be carried out while controlling, on the basis of a value detected by the force sensor 30, the arm portion 18 so that a force along a direction other than the insertion direction in which the connector 17 is inserted and a torque each have a magnitude not greater than the threshold.

Specifically, the processor 21 causes the removal operation to be carried out by, for example, controlling the arm portion 18 so that the connector 17 moves in a removal direction (that is, the negative z direction of the force sensor 30). Further, during the removal operation, the processor 21 controls the arm portion 18 so that values of components detected by the force sensor 30 other than the force component Fz, i.e., detected values of the components Fx and Fy and the torque components Mx, My, and Mz, are each not greater than a predetermined threshold.

In Step S21, the processor 21 determines whether or not the removal of the connector 17 has been completed. For example, the processor 21 refers to the start position information stored in the secondary memory 23, and determines whether or not the removal has been completed on the basis of whether or not the removal operation has moved the connector 17 to a position at which the insertion operation is started. In this case, for example, the processor 21 determines that the removal has been completed in a case where the connector 17 has moved to the start position, and determines that the removal has not been completed in a case where the connector 17 has not moved to the start position.

In a case where the removal operation has been completed (YES in Step S21), the processor 21 proceeds to the process of Step S22. In a case where the removal operation has not been completed (NO in Step S21), the processor 21 returns to the process of Step S20 to continue the removal operation.

The processor 21 outputs, to the automated guided vehicle 60, control information for moving the automated guided vehicle 60 to the initial position. Upon obtaining the control information from the information processing device 20, the automated guided vehicle 60 moves the cooperative robot 10, in Step S22, to the initial position on the basis of the control information which has been obtained.

A driver of the electric automobile 2 closes the cover portion 201a of the power feeding port 201 when the charging operation by the cooperative robot 10 is completed. The driver may close the cover portion 201a manually, or the driver may use a predetermined operator to carry out an operation for closing the cover portion 201a to thereby cause the electric automobile 2 to close the cover portion 201a.

[Generation of Training Data and Construction of Learned Model]

The following description will discuss, with reference to drawings, an operation of constructing a learned model LM1 used in Step S12 of FIG. 6 and an operation of generating training data used in the process of construction. In Embodiment 1, the information processing device 20 carries out the process of constructing the learned model LM1 and the process of generating the training data. The process of constructing the learned model LM1 and the process of generating the training data can be carried out by a device other than the information processing device 20.

The training data used in the construction of the learned model LM1 includes a captured image of the electric automobile 2 and label data that indicates a vehicle type of the electric automobile 2.

Figure 9:
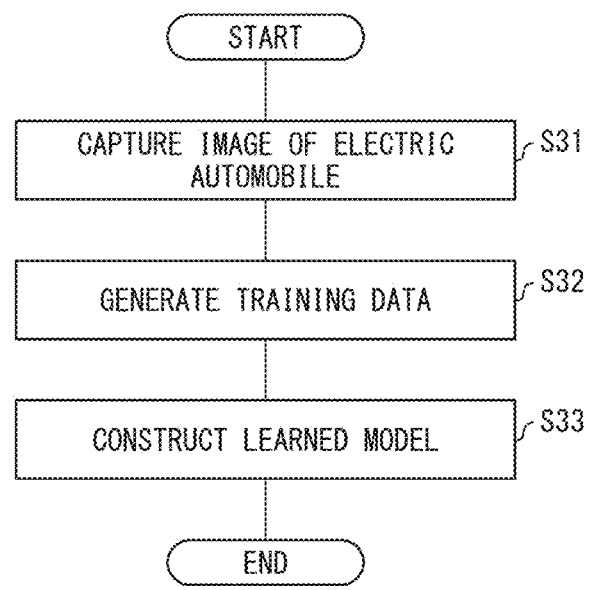
FIG. 9 is a flowchart illustrating an example of an operation of constructing a learned model and an operation of generating training data.

FIG. 9 is a flowchart illustrating an example of the operation of constructing the learned model LM1 and the operation of generating the training data. In S31, the first vision sensor 40 captures an image of the electric automobile 2 to generate a captured image. The information processing device 20 may use the captured image generated by the first vision sensor 40 as it is as an image-for-learning, or may use an image obtained by extracting a part of the captured image as the image-for-learning.

In S32, the information processing device 20 generates training data by associating label data with the image-for-learning. The label data is data indicating a vehicle type. The label data is, for example, inputted to the information processing device 20 via the input-output interface 24.

In S33, the information processing device 20 constructs the learned model LM1 by means of supervised learning using the training data. Examples of the learned model LM1 include algorithms such as neural network models (e.g., convolutional neural network and recurrent neural network), regression models (e.g., linear regression), and tree models (e.g., regression tree).

Effects of Embodiment 1

When charging the electric automobile 2, it may not always be possible to appropriately carry out alignment between the power feeding port 201 and the connector 17 and insertion of the connector 17 into the power feeding port 201. This is because, for example, a position of the power feeding port 201 differs among vehicle types, or an insertion direction in which the connector 17 is inserted into the power feeding port 201 may be slightly misaligned due to, for example, a change in air pressure in the tires of the electric automobile 2.

However, according to Embodiment 1, during an insertion operation of inserting the connector 17, an insertion direction in which the connector 17 is inserted changes because the processor 21 carries out a control so that a force applied in a direction other than the insertion direction in which the connector 17 is inserted has a magnitude not greater than a threshold. As such, even in a case where, for example, there is a slight misalignment in the position of the power feeding port 201 and in the insertion direction, the insertion direction is corrected so that the insertion can be carried out appropriately. This reduces the possibility that the connector 17 cannot be appropriately inserted into the power feeding port 201 of the electric automobile 2.

Further, according to Embodiment 1, the charging system 1 controls an insertion direction in which the connector 17 is inserted, on the basis of a force and/or a torque detected by the force sensor 30, which is a six-axis force-torque sensor. This reduces the possibility that the connector 17 cannot be appropriately inserted into the power feeding port 201 of the electric automobile 2.

Further, according to Embodiment 1, the processor 21 determines a vehicle type of the electric automobile 2 on the basis of an image captured by the sensor (such as the first vision sensor) capturing the image of the electric automobile 2, and identifies a position of the power feeding port 201 on the basis of the vehicle type which has been determined. This makes it possible to carry out the insertion of the connector 17 into the power feeding port 201 for a plurality of vehicle types of electric automobiles 2.

Further, according to Embodiment 1, the processor 21 identifies a position of the power feeding port 201 on the basis of an image captured by the second vision sensor 50. This enables the position of the power feeding port 201 of the electric automobile 2 to be identified with high accuracy even in a case where the position of the power feeding port 201 is misaligned due to a factor such as an inclination of the ground on which the electric automobile 2 is stopped, a height of the electric automobile 2, and the like.

Further, according to Embodiment 1, the processor 21 causes the automated guided vehicle 60, which is a conveying mechanism, to convey the arm portion 18 to the vicinity of the power feeding port 201, and also causes the arm portion 18 to move the connector 17 to a position facing the power feeding port 201. Thus, even in a case where the stop position at which the electric automobile 2 is stopped differs each time, it is possible to carry out the insertion of the connector 17 into the power feeding port 201 of the electric automobile 2 by conveying the connector 17 to the vicinity of the power feeding port 201.

Further, since the insertion operation is carried out while the insertion direction in which the connector 17 is inserted is changed on the basis of a result of detection by the force sensor 30, it is possible to prevent the connector 17 from being inserted into the power feeding port 201 in a wrong insertion direction. This prevents inserting the connector 17 into the power feeding port 201 in an impossible attitude, and thus prevents breakage of the connector 17 and the power feeding port 201.

Further, in Embodiment 1, an error in positional relationship between the connector 17 and the power feeding port 201 and a certain degree of error in insertion direction in which the connector 17 is inserted are corrected during the insertion operation of inserting the connector 17. This eliminates the need to use a high-precision sensor as the first vision sensor 40 capturing an image of the power feeding port 201 and also eliminates the need to use a high-precision cooperative robot 10.

Further, in Embodiment 1, in a case where the force sensor 30 has detected an external force along the z axis (in the insertion direction) that is not less than a threshold, the processor 21 determines that an insertion operation has been completed. Thus, the processor 21 can detect a completion of an insertion operation of inserting the connector 17 into the power feeding port 201.

Further, in Embodiment 1, the information processing device 20 identifies a position of the power feeding port 201, and the cooperative robot 10 is moved to the position which has been identified. This allows the cooperative robot 10 to charge the electric automobile 2 which is stopped at any position in the charging station S. That is, there is no need to predetermine a stop position at which the electric automobile 2 is to be stopped. This makes it possible to supply electricity regardless of a stop position at which the electric automobile 2 is stopped, and thus reduces burden on a driver. Further, there is no need for a driver of the electric automobile 2 to carry out a power feeding operation. The driver is thus unlikely to break the connector 17 accidentally, and there is no need for the driver to carry out complicated tasks such as handling a charging cable connected to the connector 17.

Further, in Embodiment 1, the automated guided vehicle 60 moves to the power feeding port 201 to carry out charging. As such, for example, a driver of the electric automobile 2 does not need to get out of the electric automobile 2 to carry out charging. Further, since there is no need for the driver to carry out a power feeding operation, the driver is unlikely to get accidentally electrocuted.

Further, in Embodiment 1, in a case where the processor 21 carries out a control so that each of the force components (Fx, Fy) has a magnitude not greater than a threshold, it is possible to prevent an excessive normal force from being applied to the connector 17 and a side wall of the power feeding port 201 when the connector 17 touches the side wall. Further, in a case where the processor 21 carries out a control so that each of the torque components (Mx, My, Mz) has a magnitude not greater than a threshold, it is possible to prevent an excessive frictional force from being applied to the connector 17 and the side wall of the power feeding port 201 when the connector 17 touches the side wall.

Further, in a case where the processor 21 carries out a control so that detected values of both (i) the force components (Fx, Fy) and (ii) the torque components (Mx, My, Mz) have absolute values that are each not greater than a threshold, it is possible to reduce the possibility that the connector or the power feeding port becomes damaged by a normal force or a frictional force.

[Variation]

The embodiment described above has dealt with an example configuration in which the cooperative robot 10 includes the connector 17. However, the connector 17 may be provided separately from the cooperative robot 10. In this case, for example, the connector 17 may be grabbed by a grabbing portion which is an end effector of the arm portion 18 of the cooperative robot 10, and be inserted into the power feeding port 201.

Further, in the embodiment described above, the processor 21 may detect a failure of the connector 17, a foreign matter caught in the connector 17, or the like on the basis of a value detected by the force sensor 30. In this case, for example, the secondary memory 23 has stored therein in advance, for each vehicle type, information (hereinafter, referred to as "track information") indicating a moving track in which the connector 17 would move when the connector 17 is inserted into the power feeding port 201 in a normal manner. The processor 21 compares the moving track indicated by the track information stored in the secondary memory 23 and an actual moving track of the connector 17, and in a case where the difference does not satisfy a predetermined condition, the processor 21 can determine that an abnormality has occurred. The predetermined condition is, for example, a condition that (i) the force sensor 30 has detected a force not less than a threshold along the z axis and (ii) a difference between a moving distance by which the connector 17 has moved and a moving distance corresponding to the track information stored in the secondary memory 23 is not less than a predetermined threshold.

The embodiment described above has dealt with a case in which the cooperative robot 10 and the information processing device 20 are configured as separate devices. The configuration of the charging system 1 is not limited to the one indicated in the embodiment described above. For example, the cooperative robot 10 and the information processing device 20 may be configured as an integral device.

In the embodiment described above, the processor 21 carries out the position identification step M11, the moving control step M12, and the insertion control step M13. These steps may be carried out by being shared by the information processing device 20 and one or more other devices. For example, the processor 21 may carry out the position identification step M11, and the processor provided in the cooperative robot 10 may carry out the moving control step M12 and the insertion control step M13.

In the embodiment described above, a driver of the electric automobile 2 operates the operator provided in the electric automobile 2 so as to cause the electric automobile 2 to open and/or close the cover portion 201a. The trigger for opening and/or closing the cover portion 201a is not limited to a predetermined operation by a driver, and may be other operations. For example, the control by the electric automobile 2 to open the cover portion 201a may be carried out when the connector 17 has approached the power feeding port 201 so that a distance between the connector 17 and the power feeding port 201 has become not more than a predetermined threshold. Then, the control by the electric automobile 2 to close the cover portion 201a may be carried out when the distance between the connector 17 and the power feeding port 201 has become not less than a threshold. In this case, for example, the power feeding port 201 may include a distance measuring sensor, and the distance measuring sensor may measure the distance between the power feeding port 201 and the connector 17 which has approached the power feeding port 201. The distance measuring sensor can be a known distance measuring sensor such as a time of flight (ToF) sensor, a Doppler sensor, and a camera.

Aspects of the present invention can also be expressed as follows:

A charging system in accordance with Aspect 1 is a charging system, including: an arm portion; a force sensor; a connector for charging to be inserted into a power feeding port of an electric automobile, the connector being fixed to the arm portion with the force sensor interposed between the connector and arm portion; and one or more processors, the one or more processors being configured to carry out: a position identification step of identifying a position of a power feeding port provided in the electric automobile; a moving control step of controlling the arm portion, on the basis of a result of identification in the position identification step, so as to move the connector to a position facing the power feeding port; and an insertion control step of controlling the arm portion so as to insert the connector into the power feeding port, in the insertion control step, the one or more processors controlling, on the basis of a value detected by the force sensor, the arm portion so that a force along a direction other than an insertion direction in which the connector is inserted and/or a torque have/has a magnitude not greater than a threshold.

According to the configuration, during an insertion operation of inserting the connector, the one or more processors carry out a control so that a force along a direction other than an insertion direction in which the connector is inserted and/or a torque have/has a magnitude not greater than a threshold. In a case where a control is carried out so that the force in a direction other than the insertion direction has a magnitude not greater than a threshold, it is possible to prevent an excessive normal force from being applied to the connector and a side wall of the power feeding port when the connector touches the side wall. Further, in a case where a control is carried out so that the torque has a magnitude not greater than a threshold, it is possible to prevent an excessive frictional force from being applied to the connector and the side wall of the power feeding port when the connector touches the side wall. In a case where a control is carried out so that the force in a direction other than the insertion direction and the torque each have a magnitude not greater than a threshold, it is possible to reduce the possibility that the connector or the power feeding port becomes damaged by a normal force or a frictional force.

An information processing device in accordance with Aspect 2 is an information processing device, including one or more processors which are configured to carry out: a position identification step of identifying a position of a power feeding port provided in an electric automobile; a moving control step of controlling an arm portion, to which a connector for charging to be inserted into the power feeding port is fixed with a force sensor interposed between the connector and the arm portion, on the basis of a result of identification in the position identification step so as to move the connector to a position facing the power feeding port; and an insertion control step of controlling the arm portion so as to insert the connector into the power feeding port, in the insertion control step, the one or more processors controlling, on the basis of a value detected by the force sensor, the arm portion so that a force along a direction other than an insertion direction in which the connector is inserted and/or a torque have/has a magnitude not greater than a threshold.

According to the configuration, during an insertion operation of inserting the connector, the one or more processors carry out a control so that a force along a direction other than an insertion direction in which the connector is inserted and/or a torque have/has a magnitude not greater than a threshold. Thus, the insertion operation is carried out while the insertion direction in which the connector is inserted changes. This reduces the possibility that the connector cannot be appropriately inserted into the power feeding port of the electric automobile.

[Supplementary Note]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Charging system
2: Electric automobile
10: Cooperative robot
17: Connector
18: Arm portion
20: Information processing device
21: Processor
30: Force sensor
40: First vision sensor
50: Second vision sensor
201: Power feeding port

The invention claimed is:

1. A charging system, comprising:
an arm portion;
a force sensor;
a connector for charging to be inserted into a power feeding port of an electric automobile, the connector being fixed to the arm portion with the force sensor interposed between the connector and arm portion; and
one or more processors,
the one or more processors being configured to carry out:
a position identification step of identifying a position of a power feeding port provided in an electric automobile;
a moving control step of controlling the arm portion, on the basis of a result of identification in the position identification step, so as to move the connector to a position facing the power feeding port; and
an insertion control step of controlling the arm portion so as to insert the connector into the power feeding port, wherein in the insertion control step,
the one or more processors controlling, on the basis of a value detected by the force sensor, the arm portion so that a force along a direction other than an insertion direction in which the connector is inserted and/or a torque have/has a magnitude not greater than a threshold, and
the one or more processors detecting, on the basis of a value detected by the force sensor, a failure of the connector or a foreign matter caught in the connector.

2. The charging system as set forth in claim 1, wherein the force sensor is a six-axis force-torque sensor.

3. The charging system as set forth in claim 1, wherein, in the position identification step, the one or more processors (i) determine a vehicle type of the electric automobile on the basis of an image captured by a sensor configured to capture the image of the electric automobile and (ii) identify the position of the power feeding port on the basis of the vehicle type which has been determined.

4. The charging system as set forth in claim 1, wherein, in the position identification step, the one or more processors identify the position of the power feeding port on the basis of an image captured by a sensor configured to capture the image of the power feeding port.

5. The charging system as set forth in claim 1, further comprising a conveying mechanism configured to convey the arm portion,
in the moving control step, the one or more processors causing the conveying mechanism to convey the arm portion to the vicinity of the power feeding port and causing the arm portion to move the connector to the position facing the power feeding port.

6. The charging system as set forth in claim 1, wherein, in the insertion control step, the one or more processors determine, in a case where the force sensor has detected an external force greater than a threshold in the insertion direction, that insertion of the connector has been completed.

7. The charging system as set forth in claim 1, wherein the failure of the connector or the foreign matter caught in the connector is detected on the basis of (i) a result of comparison between (a) track information stored in a memory and indicating a moving track of a connector and (b) a moving track of the connector fixed to the arm portion and (ii) a value detected by the force sensor.

8. An information processing device, comprising one or more processors which are configured to carry out:
a position identification step of identifying a position of a power feeding port provided in an electric automobile;
a moving control step of controlling an arm portion, to which a connector for charging to be inserted into the power feeding port is fixed with a force sensor interposed between the connector and the arm portion, on the basis of a result of identification in the position identification step so as to move the connector to a position facing the power feeding port; and
an insertion control step of controlling the arm portion so as to insert the connector into the power feeding port, wherein in the insertion control step,
the one or more processors controlling, on the basis of a value detected by the force sensor, the arm portion so that a force along a direction other than an insertion direction in which the connector is inserted and/or a torque have/has a magnitude not greater than a threshold, and
the one or more processors detecting, on the basis of a value detected by the force sensor, a failure of the connector or a foreign matter caught in the connector.

9. The information processing device as set forth in claim 7, wherein the one or more processors are further configured to detect the failure of the connector or the foreign matter caught in the connector is detected on the basis of (i) a result of comparison between (a) track information stored in a memory and indicating a moving track of a connector and (b) a moving track of the connector fixed to the arm portion and (ii) a value detected by the force sensor.

* * * * *